(12) United States Patent
Berkman et al.

(10) Patent No.: US 7,804,763 B2
(45) Date of Patent: Sep. 28, 2010

(54) POWER LINE COMMUNICATION DEVICE AND METHOD

(75) Inventors: William H. Berkman, New York, NY (US); John C. Boot, Clarksburg, MD (US)

(73) Assignee: Current Technologies, LLC, Germantown, MD (US)

( * ) Notice: Subject to any disclaimer, the term of this patent is extended or adjusted under 35 U.S.C. 154(b) by 390 days.

(21) Appl. No.: 11/462,123

(22) Filed: Aug. 3, 2006

(65) Prior Publication Data

US 2007/0002772 A1   Jan. 4, 2007

Related U.S. Application Data

(63) Continuation-in-part of application No. 11/097,132, filed on Apr. 4, 2005, now Pat. No. 7,265,664.

(51) Int. Cl.
*H04J 11/00* (2006.01)
(52) U.S. Cl. .................. 370/208; 370/229; 370/299; 370/352; 370/469; 370/481
(58) Field of Classification Search .......... 370/208, 370/229, 299, 352–357, 469, 294; 455/402, 455/574; 709/222, 249; 340/310.1, 538.11, 340/693.1, 310.03
See application file for complete search history.

(56) References Cited

U.S. PATENT DOCUMENTS

| 1,547,242 | A | 7/1925 | Strieby |
| 4,504,705 | A | 3/1985 | Pilloud |
| 4,517,548 | A | 5/1985 | Ise |

(Continued)

FOREIGN PATENT DOCUMENTS

DE   100 08 602 A1   6/2001

(Continued)

OTHER PUBLICATIONS

Bernard Sklar, Digital Communications Fundamentals and Applications, 2001, Prentice Hall PTR, Second Edition, pp. 117-119, 522-523.*

(Continued)

*Primary Examiner*—Jason E Mattis
*Assistant Examiner*—Joey Bednash
(74) *Attorney, Agent, or Firm*—Mel Barnes; Capital Legal Group, LLC

(57) ABSTRACT

A power line communication device for communicating data signals over a power line is provided. One example embodiment comprises a conditioning circuit configured to be coupled to the power line and a modem communicatively coupled to the conditioning circuitry to transmit and receive data signals over the power line via the conditioning circuitry. The modem may be configured to transmit and receive orthogonal frequency division multiplexed data signals that comprise a plurality of sub-carriers, wherein the modem is adapted to vary the transmit power for each of a plurality of subsets of the plurality of sub-carriers from substantially zero power to a plurality of increments above zero power. The modem also may be adapted to transmit and receive data signals with the transmit power for each of a plurality of subsets of the plurality of sub-carriers being different and to transmit and receive using a different modulation scheme at different sub-carriers.

49 Claims, 4 Drawing Sheets

U.S. PATENT DOCUMENTS

| | | | |
|---|---|---|---|
| 4,636,771 A | 1/1987 | Ochs | |
| 4,668,934 A | 5/1987 | Shuey | |
| 5,185,591 A | 2/1993 | Shuey | |
| 5,351,272 A | 9/1994 | Abraham | |
| 5,777,544 A | 7/1998 | Vander Mey et al. | |
| 5,995,572 A | 11/1999 | Dettmar | |
| 6,313,738 B1 | 11/2001 | Wynn | |
| 6,331,814 B1 | 12/2001 | Albano | |
| 6,396,392 B1* | 5/2002 | Abraham | 370/282 |
| 6,480,510 B1 | 11/2002 | Binder | |
| 6,522,650 B1 | 2/2003 | Yonge, III et al. | |
| 6,891,796 B1* | 5/2005 | Manis et al. | 370/229 |
| 6,950,567 B2 | 9/2005 | Kline | |
| 6,958,680 B2 | 10/2005 | Kline | |
| 6,965,302 B2 | 11/2005 | Mollenkopf et al. | |
| 6,965,303 B2 | 11/2005 | Mollenkopf | |
| 7,142,094 B1 | 11/2006 | Davidow et al. | |
| 7,206,320 B2* | 4/2007 | Iwamura | 370/448 |
| 7,269,403 B1* | 9/2007 | Miao | 455/402 |
| 2001/0054953 A1* | 12/2001 | Kline | 340/310.01 |
| 2002/0041228 A1 | 4/2002 | Zhang | |
| 2002/0060624 A1 | 5/2002 | Zhang | |
| 2002/0080010 A1 | 6/2002 | Zhang | |
| 2002/0095662 A1 | 7/2002 | Ashlock et al. | |
| 2002/0097953 A1 | 7/2002 | Kline | |
| 2002/0098867 A1 | 7/2002 | Meiksen et al. | |
| 2002/0098868 A1 | 7/2002 | Meiksen et al. | |
| 2002/0109585 A1* | 8/2002 | Sanderson | 340/310.01 |
| 2002/0110310 A1* | 8/2002 | Kline | 385/15 |
| 2002/0110311 A1* | 8/2002 | Kline | 385/15 |
| 2002/0118101 A1* | 8/2002 | Kline | 340/310.01 |
| 2002/0121963 A1 | 9/2002 | Kline | |
| 2002/0154000 A1 | 10/2002 | Kline | |
| 2003/0062990 A1 | 4/2003 | Schaeffer, Jr. et al. | |
| 2003/0071721 A1* | 4/2003 | Manis et al. | 340/310.03 |
| 2003/0169155 A1 | 9/2003 | Mollenkopf et al. | |
| 2003/0224784 A1 | 12/2003 | Hunt et al. | |
| 2004/0001499 A1 | 1/2004 | Patella et al. | |
| 2004/0037214 A1* | 2/2004 | Blasco Claret et al. | 370/203 |
| 2004/0110483 A1 | 6/2004 | Mollenkopf | |
| 2004/0113756 A1 | 6/2004 | Mollenkopf | |
| 2004/0113757 A1 | 6/2004 | White, II et al. | |
| 2004/0174851 A1 | 9/2004 | Zalitzky et al. | |
| 2004/0212481 A1* | 10/2004 | Abraham | 340/310.01 |
| 2004/0223617 A1 | 11/2004 | Corcoran et al. | |
| 2004/0227621 A1 | 11/2004 | Cope et al. | |
| 2004/0227622 A1 | 11/2004 | Giannini et al. | |
| 2004/0242185 A1 | 12/2004 | Lee | |
| 2004/0266332 A1 | 12/2004 | Lang | |
| 2005/0063422 A1 | 3/2005 | Lazar et al. | |
| 2005/0128057 A1 | 6/2005 | Mansfield et al. | |
| 2005/0164666 A1 | 7/2005 | Lang et al. | |
| 2005/0226200 A1* | 10/2005 | Askildsen et al. | 370/347 |
| 2005/0254442 A1* | 11/2005 | Proctor et al. | 370/294 |
| 2006/0290476 A1* | 12/2006 | Zitting et al. | 340/310.18 |

FOREIGN PATENT DOCUMENTS

| | | |
|---|---|---|
| DE | 100 12 235 C2 | 12/2001 |
| DE | 101 19 039 A1 | 12/2002 |
| DE | 101 19 040 A1 | 12/2002 |
| DE | 100 26 930 C2 | 1/2003 |
| DE | 100 26 931 C2 | 1/2003 |
| DE | 101 47 916 C1 | 5/2003 |
| DE | 101 46 982 C1 | 6/2003 |
| EP | 0 581 351 A1 | 2/1994 |
| EP | 1 011 235 A3 | 5/2002 |
| EP | 1 021 866 B1 | 10/2002 |
| ES | 2 122 920 A1 | 12/1998 |
| GB | 2 315 937 A | 2/1998 |
| JP | 10200544 A2 | 7/1998 |
| WO | WO-01/50625 A2 | 7/2001 |
| WO | WO-01/50625 A3 | 7/2001 |
| WO | WO-01/63787 A1 | 8/2001 |
| WO | WO-03/009083 A2 | 1/2003 |
| WO | WO-03/009083 A3 | 1/2003 |
| WO | WO-03/010896 A1 | 2/2003 |
| WO | WO-00/16496 A2 | 3/2003 |
| WO | WO-03/040732 A2 | 5/2003 |
| WO | WO-03/056715 A1 | 7/2003 |

OTHER PUBLICATIONS

Pete McArthur, Amped Up and Ready to Go, Sep. 2004, IEEE Spectrum, pp. 14-18.*

IEEE 100, The Authoritative Dictionary of IEEE Standards Terms, Dec. 2000, Seventh Edition, p. 993.*

Gutzwiller, F W., et al., "Homenet: A Control Network for Consumer Applications", *IEEE Transactions on Consumer Electronics*, (Aug. 1983),297-304.

Onunga, J et al., "Distribution Line Communications Using CSMA Access Control with Priority Acknowledgements", *IEEE Transactions on Power Delivery*, (Apr. 1989),878-886.

Yoshitoshi, M et al., "Proposed Interface Specifications for Home Bus", *IEEE Transactions on Consumer Electronics*, (Aug. 1986),550-557.

Dostert, K "EMC Aspects of High Speed Powerline Communications", *Proceedings of the 15th International Wroclaw Symposium and Exhibition on Electromagnetic Capability*, (Jun. 27-30, 2000),98-102.

Piety, R A., "Intrabuilding Data Transmission Using Power-Line Wiring", *Hewlett-Packard Journal*, (May 1987),35-40.

"Archnet: Automatic Meter Reading System Power Line Carrier Communication", www.archnetco.com/english/product/product_sl.htm, (2001).

Chang, SS L., "Power-Line Carrier", *Fundamentals Handbook of Electrical and Computer Engineering*, vol. II-*Communication, Control, Devices and Systems*, (1983),617-627.

Chen, Y-F et al., "Baseband Transceiver Design of a 128-Kbps Power-Line Modem for Household Applications", *IEEE Transactions on Power Delivery*, (2002),338-344.

Kim, W-O et al., "A Control Network Architecture Based on EIA-709.1 Protocol for Power Line Data Communications", *IEEE Transactions on Consumer Electronics*, (2002),650-655.

Nichols, K "Build a Pair of Line-Carrier Modems", *CRC Electronics-Radio Electronics*, (1988),87-91.

"HomePlug Initital Draft Medium Interface Specification", *HomePlug Powerline Alliance*, (May 19, 2000),1-109.

"HomePlug Powerline Alliance,", *HomePlug 0.5 Draft Medium Interface Specification,*, (Nov. 28, 2000),1-133.

"HomePlug Initital Draft Medium Interface Specification", *HomePlug Powerline Alliance*, (Jul. 27, 2000),1-109.

"HomePlug 1.01 Specification", *HomePlug Powerline Alliance*, (Dec. 1, 2001),1-39.

"Summary of an IEEE Guide for Power-Line Carrier Applications", *IEEE Transactions on Power Apparatus and Systems*, (Nov./Dec. 1980),2334-2337.

De Wilde, W R., et al., "Upwards to a Reliable Bi-Directional Communication Link on the LV Power Supplies for Utility Services: Field Tests in Belgium", *Sixth International Conference on*, (Apr. 3-5, 1990),168-172.

"IEEE Guide for Power-Line Carrier Applications, ANSI/IEEE Std 643-1980", *The Institute of Electrical and Electronics Engineers, Inc.*, (1980),1-80.

* cited by examiner

POWER LINE COMMUNICATION DEVICE AND METHOD

CROSS REFERENCE TO RELATED APPLICATIONS

This application is a continuation-in-part of, and claims priority to, U.S. patent application Ser. No. 11/097,132 filed Apr. 4, 2005, now U.S. Pat. No. 7,265,664 which is incorporated herein by reference in its entirety.

FIELD OF THE INVENTION

The present invention generally relates to methods and apparatus for providing data services, and more particularly to devices, systems, and methods for communicating data, such as high data rate broadband data, over a power line.

BACKGROUND OF THE INVENTION

Users are increasingly relying on immediate access to many types of data for their entertainment, work and communication needs. Users access cell phones to communicate over wireless communication networks. Entertainment appliances, such as televisions, receive cable signals to view television shows and movies on demand. Users access the internet to exchange e-mail communications and communicate audio, video, multimedia and textual data. Delivering these various data services requires a communications infrastructure.

One type of infrastructure being adapted to deliver broadband communication services to user premises is the power distribution system infrastructure. Power line communication systems include devices for transmitting data signals over power lines such as high, medium, or low voltage power line. Such systems also may utilize other communications media.

One challenge in implementing data communications over power lines—especially high speed data communications—is the noisy environment of the power lines. In other words, power lines are susceptible to electrical "noise" or interference from external sources. In some power line communication systems, this noise may hamper or prohibit reliable high speed communications. Furthermore, power lines are very lossy at the frequencies used for high speed power line communications. There are, however, federal regulations that limit the power than can be used for communications over the power lines in various frequency bands. Accordingly there is a need for a power line communication device that communicates effectively under varying signal conditions.

Further, as the demand for high data rate services of all kind increases, there is a need for power line communication devices to be more versatile, more effective, and more economically efficient at delivering data services.

SUMMARY OF THE INVENTION

The present invention provides a power line communication device for communicating data signals over a power line. One example embodiment comprises a conditioning circuit configured to be coupled to the power line and a modem communicatively coupled to the conditioning circuitry to transmit and receive data signals over the power line via the conditioning circuitry. The modem may be configured to transmit and receive orthogonal frequency division multiplexed data signals that comprise a plurality of sub-carriers, wherein the modem is adapted to vary the transmit power for each of a plurality of subsets of the plurality of sub-carriers from substantially zero power to a plurality of increments above zero power. The modem also may be adapted to transmit data signals with the transmit power for each of a plurality of subsets of the plurality of sub-carriers being different and to transmit using a different modulation scheme at different sub-carriers.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

Communication System

The communications network of the present invention may provide high data rate internet access, mobile telephone communications, broadband communications, streaming video and audio services, and other communication services to each home, building or other structure, and to each room, office, apartment, or other unit or sub-unit of a multi-unit structure. In addition, the power line wireless network may provide these communication services to mobile and stationary devices in outdoor areas such as customer premises yards, parks, stadiums, and also to public and semi-public indoor areas such as subway trains, subway stations, train stations, airports, restaurants, public and private automobiles, bodies of water (e.g., rivers, bays, inlets, etc.), building lobbies, elevators, etc.

Figure 1:
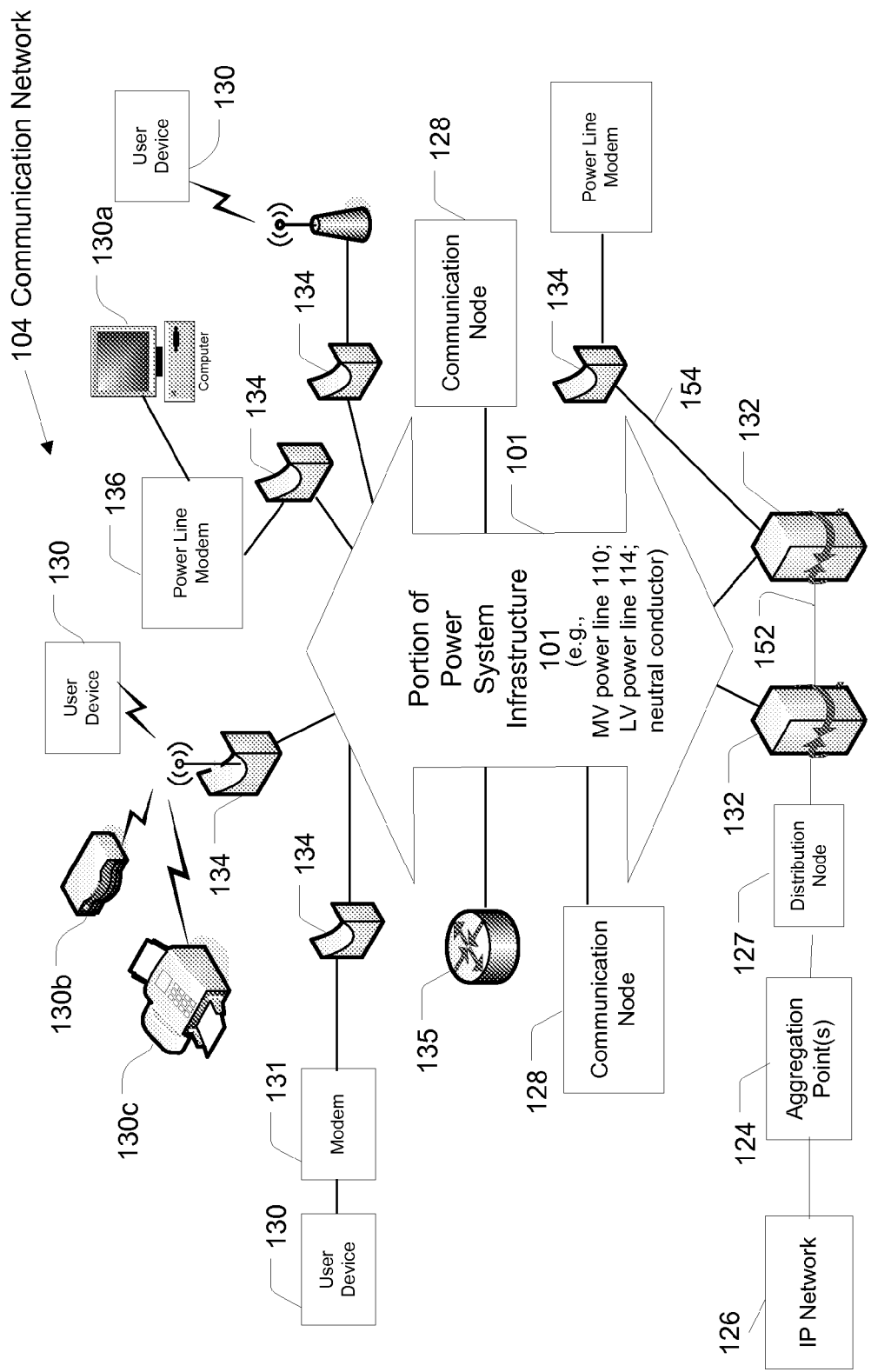
FIG. 1 is a block diagram of a example communication system relying on a variety of communications media, including power lines, wired and wireless media.

FIG. 1 shows components of a communication network 104 that may rely, in part, on portions of the power system infrastructure 101 to carry data communications. The communication network 104 includes a plurality of communication nodes which communicate with each other and other devices via power lines and other communication media. Various user devices 130 and power line communication devices may transmit and receive data over the links to communicate via an IP network 126 (e.g., the Internet). One type of communication node 128 may be a backhaul node 132. Another type of communication node 128 may be an access node 134. Another type of communication node 128 may be a repeater node 135. A given node 128 may serve as a backhaul node 132, access node 134, and/or repeater node 135.

One type of communication link is formed between two communication nodes 128 over a communication medium. Some links may be formed over MV power lines 110 or over LV power lines 114. Other communication links of the communication network 104 may be wireless links. Still other links may be formed over coaxial cables, such as gigabit-Ethernet links 152, 154. Thus, some communication links may be formed using a portion 101 of the power system infrastructure, while other links may be formed over another communication media. The links formed by wired or wireless media may occur at any point along a communication path between a backhaul node 132 and a user device 130 (e.g., between a backhaul node 132 and an access node 134; between an access node 134 and another access node 134; between an access node 134 and a user device 130), or between a backhaul node 132 and a distribution point 127 or aggregation point 124.

Each communication node 128 may be formed by one or more communication devices. Communication nodes (and devices) which communicate over a power line medium are referred to herein as a power line communication device. Exemplary power line communication devices include a backhaul device 138 (see FIG. 4), an access device 139 (see FIG. 6), and a repeater 135. Such devices may include a modem, which may implement various signal sets, such as a HomePlug signal set, a WiMAX (Worldwide Interoperability for Microwave Access also sometimes referred to as WirelessMAN or conforming to IEEE 802.16) signal set, or another signal set. Communication nodes which communicate wirelessly may include an access point, a mobile telephone cell site, a WiMAX wireless transceiver, or other wireless modem. Communication nodes which communicate over a coaxial cable may include a cable modem. Communication nodes which communicate over a twisted pair wire may include a DSL modem or other modem. A given communication node typically will communicate in two directions (either full duplex or half duplex), which may be over the same or different types of communication media. Accordingly, a communication node may include one, two or more communication devices.

A backhaul node 132 may serve as an interface between a power line portion (e.g., an MV power line 110) and an aggregation point 124 that may provide a connection to an IP network 126. The communication network 104 preferably includes one or more backhaul nodes 132 disposed over a geographical area such as a city. Upstream communications from user premises may be communicated to an access node 134, to a backhaul node 132, and then transmitted to an aggregation point 124 which is linked to the IP network 126. The backhaul node 132 may be coupled to the aggregation point 124 directly or indirectly (i.e., via one or more intermediate nodes). The backhaul node 132 may communicate with its upstream device via any of several alternative communication media, such as a fiber optic (digital or analog (e.g., Wave Division Multiplexed), coaxial cable, WiMAX, IEEE 802.11, twisted pair (e.g., DSL), and/or another wired or wireless media. Downstream communications from the IP network 126 typically are communicated through the aggregation point 124 to the backhaul node 132. The aggregation point 124 typically includes an Internet Protocol (IP) network data packet router and is connected to an IP network backbone, thereby providing access to an IP network 126 (i.e., the AP 124 can be connected to or form part of a point of presence or POP). Any available mechanism may be used to link the aggregation point 124 to the POP or other device (e.g., fiber optic conductors, T-carrier, Synchronous Optical Network (SONET), and wireless techniques).

An access node 134 may serve one or more user devices 130 or other network destinations. Upstream data may be transmitted, for example, from a user device 130 to an access node 134 via a communication medium (e.g., an LV power line 114) coupled to an access node 134 or wirelessly. The data is routed through the network 104 to a backhaul node 132, (or a local destination, such as another user device 130). Downstream data is sent through the network 104 to a user device 130 via an access node 134. Exemplary user devices 130 include a computer 130a, LAN, a WLAN, router 130b, Voice-over IP endpoint, game system, personal digital assistant (PDA), mobile telephone, digital cable box, power meter, gas meter, water meter, security system, alarm system (e.g., fire, smoke, carbon dioxide, security/burglar, etc.), stereo system, television, fax machine 130c, HomePlug residential network, or other device having a data interface. A user device 130 may include or be coupled to a modem to communicate with a given access node 134. Exemplary modems include a power line modem 136, a wireless modem, a cable modem 131, a DSL modem or other suitable transceiver device.

A repeater node 135 may receive and re-transmit data (i.e., repeat), for example, to extend the communications range of other communication elements. As a communication traverses the communication network 104, backhaul nodes 132 and access nodes 134 also may serve as repeater nodes 135 (e.g., for other access nodes and other backhaul nodes 132). Repeaters may also be stand-alone devices without additional functionality. Repeaters 135 may be coupled to and repeat data on MV power lines or LV power lines (and, for the latter, be coupled to the internal or external LV power lines).

Figure 2:
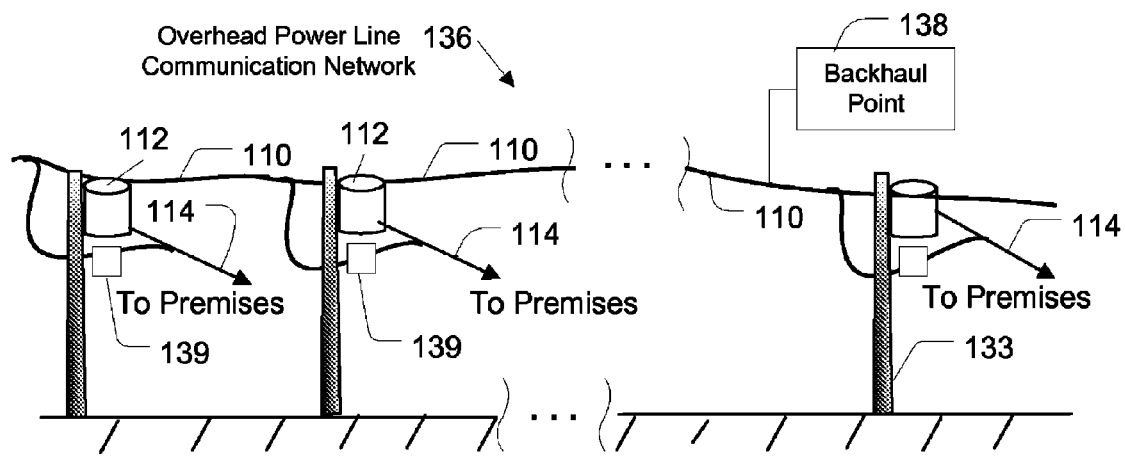
FIG. 2 is a block diagram of a portion of a communication system including an overhead power line network.
Figure 3:
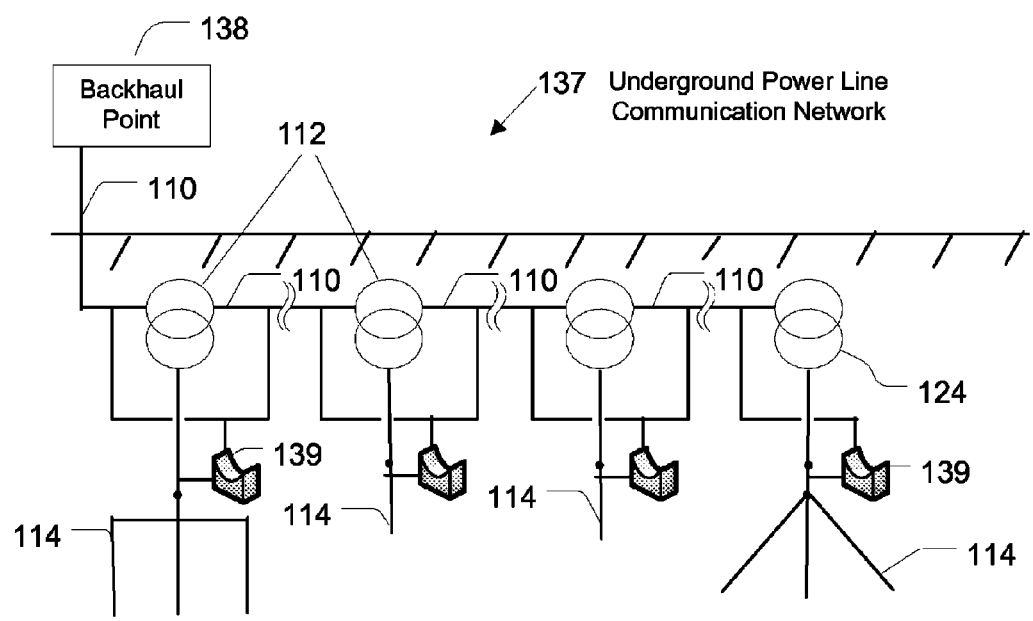
FIG. 3 is a block diagram of a portion of a communication system including an underground power line network.

FIG. 2 shows an overhead portion 136 of an example embodiment of the communication network 104 in which some signals may be communicated along overhead power lines. FIG. 3 shows an underground portion 137 of an example embodiment of the communication system 104 in which some signals may be communicated along underground power lines. In some configurations an underground power line communication network portion 137 may couple to an overhead power line, or be coupled to an overhead power line communication network portion 136.

In the overhead portion 136, broadband data signals may propagate along medium voltage (MV) power lines 110 and low voltage (LV) power lines 114. In this example system, MV power lines 110 distribute medium level power voltages to a region or local area. Typical voltage levels on the MV power lines 110 range from about 1000V to about 100 kV. LV power lines 114 carry low level power voltages to households, office, building units and other types of premises. Typical voltage levels on LV power lines 114 range from about 100 V to about 240 V. The MV power line voltages are stepped down at distribution transformers 112 to provide low voltage power signals carried by the LV power lines 114.

Referring to FIGS. 2 and 3, because the high frequency data signals do not readily propagate through the distribution transformers 112, a device for bypassing the transformer 112 may be included. In some embodiments the device is part of an access device 139 forming part of an access node 134. This example access device 134 may be coupled to an MV power line 110 and a LV power line 114 and may bridge data around the distribution transformer 112 (i.e., to bypass the transformer 112). In various embodiments and various cases of a given embodiment, the access device 139 may transmit the data signal onto both the MV power line 110 and LV power line 114, onto either of the MV power line 110 or LV power line 114, and/or onto an alternative communication medium. The access device 139 may also act as a repeater by receiving data from the MV power line 110 and transmitting that data back onto the MV power line 110. In the embodiment shown in FIG. 3, access devices 139 may be coupled to the MV power line 110 on each side of a distribution transformer 112.

Communication Protocols

The communication network 104 may provide high data rate internet access and other high data-rate services (e.g., data; voice; video) to user devices 130 in homes, buildings and other structures, and to each room, office, apartment, or other unit or sub-unit of multi-unit structure. In doing so, a communication link is formed between two communication nodes 128 over a communication medium. As described above, the communication links may be formed by power lines, non-power line wired media, and wireless media, and may occur at any point along a communication path between a backhaul node 132 and a user device 130, or between a backhaul node 132 and a distribution point 127 or aggregation point 124.

Communication among nodes 128 may occur using a variety of protocols and media. For example, protocols such as IEEE 802.11 a/b/g, 802.16, 1G, 2G, 3G, a satellite communication protocol such as WildBlue®, Ethernet, multipoint microwave distribution system (MMDS) standards, DOCSIS (Data Over Cable System Interface Specification) signal standards or another suitable communication protocol may be implemented (depending on the medium). The wireless links may also use any suitable frequency band. In one example, frequency bands are used that are selected from among ranges of licensed frequency bands (e.g., 6 GHz, 11 GHz, 18 GHz, 23 GHz, 24 GHz, 28 GHz, or 38 GHz band) and unlicensed frequency bands (e.g., 900 MHz, 2.4 GHz, 5.8 Ghz, 24 GHz, 38 GHz, or 60 GHz (i.e., 57-64 GHz)).

In various embodiments, the communications among nodes may be OFDMA, time division multiple access (TDMA) and/or frequency division multiple access (FDMA) and also may comprise point to multi-point communications and/or point to point communications. In one example, the nodes 128 may use time division multiplexing and implement one or more layers of the 7 layer open systems interconnection (OSI) model. For example, at the layer 3 'network' level, the devices and software may implement switching and routing technologies, and create logical paths, known as virtual circuits, for transmitting data from node to node. Similarly, error handling, congestion control and packet sequencing can be performed at Layer 3. In one example embodiment, Layer 2 'data link' activities include encoding and decoding data packets and handling errors of the 'physical' layer 1, along with flow control and frame synchronization. The configuration of the various communication nodes may vary.

The term "modem" as used herein is meant to refer to a modem chip, modem chip set, or modem integrated circuit, which form part of a larger communication device. In some embodiments, such as modems configured to communicate over power lines, a scalable orthogonal frequency division multiplexing (OFDM) scheme may be implemented. OFDM is a technique for transmitting large amounts of digital data using multiple carriers over a frequency band. Specifically, in OFDM communications a single transmitter transmits on many (typically dozens to thousands) of different orthogonal frequencies. Typically, the frequencies are closely spaced so that each sub-carrier carries a narrowband signal. An OFDM carrier signal is the sum of the orthogonal sub-carriers, with baseband data on each sub-carrier being independently modulated, such as by quadrature amplitude modulation (QAM) or quadrature phase-shift keying (QPSK). In one example embodiment, the nodes 128 (via their respective modems) employ Orthogonal Frequency Division Multiple Access (OFDMA) over the MV power line.

In one example embodiment, the modem 141 (see FIGS. 4 and 6) may be included at a communication node to transmit and receive communications over a power line. According to an embodiment of this invention, the modem 141 may implement a variety of features including adaptive transmit power control of sub-carriers adaptive modulation, and a versatile signal set, and may be coupled to a variety of communications media.

Specifically, in this example embodiment modem 141 may be configured to transmit using adaptive transmission power of OFDM sub-carriers. This includes the ability of the modem to control (increase or decrease) the transmission power of one or more sub-carriers over a plurality of power levels. In contrast to some prior art modems which could turn on or turn off groups of sub-carriers, one example embodiment of the present invention can be configured to adjust the power level of one or more sub-carriers to one of a plurality of power levels (e.g., voltage levels), which may be between a maximum power level and zero. In other words, this example embodiment may adjust the transmission power of one or more sub-carriers to any of five, ten, twenty, or more power levels (depending on the implementation and/or conditions). By increasing the transmission power of some subset(s) of the sub-carriers (e.g., higher frequencies that attenuate more quickly over power lines) and decreasing the transmission power of other subset(s) of the sub-carriers (e.g., lower frequency sub-carriers that do not attenuate as quickly), the overall transmission power (i.e., the transmission power over the entire band of sub-carriers) may remain substantially the same (i.e., the same as if a moderate and equal transmission power was used across all sub-carriers) and within federal limits while allowing more reliable communications over greater distances than previous modems.

Another advantage of implementing adaptive transmit power of sub-carriers within OFDM for power line communications is that transmissions are controllable at a sub-channel level (e.g., on one or more sub-carriers), as well as at a channel level (all carriers or some subset group of sub-carriers) thereby allowing control of radiated transmissions. Thus, the system can be flexible to ensure that the system does not interfere with other communications. For example, adaptive transmit power scaling may permit the use of different transmission power levels in different locations, different frequencies, or under different circumstances. In one example embodiment, by reducing the power output of (i.e., turning off) certain sub-carriers the modem 141 can be configured to communicate via a selected frequency band (which can vary over time and/or for device, application, user and/or group thereof).

Adaptive transmit power of sub-carriers may allow individual users, applications, device(s), or groups of users, applications or devices, to be designated a power level according to needs. For example, a device requiring a lower QOS and/or bandwidth may be designated lower transmission power for its sub-channel, while a device requiring higher QOS and/or bandwidth may have the transmission power adapted higher for its communications. The sub-channel (sub-carriers and frequency band) may be the same, different or partial overlapping for the two or more devices. Likewise the transmissions may or may not be simultaneous. Lower power also may allow for enhanced frequency re-use among adjacent medium voltage power line subnets and may be preferred when sufficient. Transmit power of sub-carriers may be manually or system assigned statically, by a commanding network management system or controller module or may be dynamically allocated and reallocated according to changing system topologies, or the changing needs users, applications or devices.

As another example, adaptive transmit power scaling permits transmitting data signals at reduced (or zero) power at a first set of frequencies within a channel (e.g., frequency bands known to be used by another communication system), while maintaining (or increasing) power at other frequencies within the channel. This is sometimes referred to as notching. By using adaptive transmit power scaling to notch sub-carriers, interference with other communication systems may be reduced. It is worth noting that the while any multi-carrier modem (e.g., modem chip or chip set) could be notched via circuitry external to the modem, unlike the present invention the receiving modem of like kind might not be capable of receiving the notched signal if, for example, the notch covers too many sub-carriers and the present example embodiment may not need such external notch filtering.

In some embodiments, the modem 141 also may implement adaptive modulation. Power Line communications utilizing adaptive modulation may vary the modulation scheme by channel in a multi-channel system. Also, within a channel the modulation scheme may be varied by sub-channel. For example, some frequency bands (e.g., a sub-channel comprised of one or more carriers) may use one modulation scheme, while another band uses a different modulation scheme (during a simultaneous or contemporaneous transmission/reception). Further, the modulation scheme may be varied within a sub-channel over time as conditions change or due to other factors. Modulation schemes also may be modified by intervention (e.g., via receiving a command from an external device) or automatically (e.g., as a result of the execution of program code stored in memory of the modem 141 or controller in operative communication with the modem 141) based upon (e.g., detection of) system load, type and/or number of applications being supported, number of users, signal to noise ratio, error rate, data rate, and/or other parameter(s). Modulation schemes used in this example embodiment may include 16 QAM, 64 QAM, and QPSK.

In some embodiments the modem 141 may be coupled to one or more different communication media, such as a MV power line 110, a LV power line 114, a coaxial cable, a twisted pair, and a wireless medium (e.g., an antenna). A 3 db splitter may be coupled to the modem 141 to split the signal for transmission over for communication over more than one of the various communications media. In addition, a frequency translation circuit may be used to couple the modem 141 to one or more media (e.g., to the power line).

In one embodiment of the modem 141, a signal set of a modem 141 substantially compatible with, substantially conforming to, or certified to the IEEE 802.16 (d and/or e) standard (WiMAX) may be implemented, in which the signal frequencies are shifted to a desired frequency (e.g., downbanded to the desired frequency band). Thus, the modems may be substantially compatible with an IEEE 802.16 (e) standard or (d) standard. "WiMAX" is an acronym that stands for Worldwide Interoperability for Microwave Access. It is a technology generally known for delivering last mile wireless broadband access as an alternative to cable and DSL broadband access. Although WiMAX is intended for wireless applications, a signal set (or modem) substantially compatible with WiMAX may be adapted according to an embodiment of this invention to transmit and receive communications over an alternative communications medium, such as a medium voltage power line, a low voltage power line, or a coaxial cable. Alternatively, some embodiments of the modem 141 (such as those used to communicate via a low voltage power line) may implement a signal set substantially compatible with the HomePlug 1.0, or A/V standard, but may not include various features described herein.

As an additional feature, some example embodiments of the modem 141 may implement a common Media Access Control (MAC) layer for all physical layer PHY adaptations (e.g., single carrier; 256 OFDM; 2048 OFDMA). The MAC may provide a Time Division Multiplex (TDM) downlink coupled with Time Division Multiple Access (TDMA) access in the uplink.

One example modem may implement Scalable (Scaleable) OFDM, which includes a mechanism by which the sub-carrier spacing is independent of the bandwidth and the number of used sub carriers (and Fast Fourier Transform (FFT) size) scales with bandwidth. In other words, as bandwidth doubles the FFT size doubles and therefore the sub carrier size doubles.

The modem 141, (and devices in communication with the modem 141), may use all the bandwidth that is already allocated to it and also may make requests (and grant the requests from other devices) for additional bandwidth. Such requests (and replies granting or denying the requests) may be transmitted over the power line conductor(s).

In some embodiments of the communication system 104, communication devices may change MAC and/or PHY parameters based upon software instructions. Examples of parameters that may be changed in this manner may include: frequency, channel size, sub-channel number, sub-channel on/off or sub-channel power adaptions, modulation type either per channel or sub channel, or by time and/or by MAC address, and/or MAC block.

Further, in some embodiments of the communication system 104, communication devices may change MAC and PHY parameters and capabilities based upon information of the environment. For example, parameters and capabilities may be changed based upon information related to: system load; type and/or number of applications being supported; number of users and/or user devices; prioritization levels of network traffic; service level agreements (e.g., QoS) of users and/or user devices; failure of a device or service; and historical behavior of the system, projections based upon historical behaviors of the system, and/or projections based upon historical behaviors of the system and/or other information. The information may become known via detection by the modem itself, by receiving information transmitted from another device, and/or via other means.

In one example embodiment, modem may be configured to vary the size of frames and the size of individual slots within the frames on a frame by frame basis. The modem may also be configured to provide Quality of Service (QoS) via one of: real time polling, non-real time polling, best effort, or constant bit rate grant. In example embodiment, the modem may be configured to provide forward error correction via Reed-Solomon and convolutional coding.

In one example embodiment, the modem may be adapted communicate via a wide delay spread values such as a root-mean-square delay spread from 1 μs (or below) to 10 μs (or above).

Communication Devices

Each communication node 128 may be formed by one or more communication devices. Communication nodes which communicate over a power line medium include a power line communication device. Exemplary power line communication devices include a backhaul point 138 (see FIGS. 4 and 5), an access device 139 (also referred to as a power line bridge) (see FIGS. 6 and 7), a repeater, and a power line modem 136 (see FIG. 1). Communication nodes which communicate via a wireless medium may include a wireless access point having at least a wireless transceiver (which may comprise a mobile telephone base station (e.g., a micro or pico cell site) or WiMAX base station). Communication nodes which access a link over a coaxial cable may include a cable modem. Communication nodes which access a link over a T-1 wire may include a DSL modem. In an embodiment according to this invention, a communication node may include a modem 141 which allows a common modem to be used for communications over multiple media such as one or more of a power line, a coaxial cable, a twisted pair and a wireless medium. Thus, a backhaul point 138, access device 139 or repeater 135 may establish links over MV power lines 110, LV power lines 114, other wired media, and wireless link. Further, a given communication node 128 may communicate in two or more directions establishing multiple communication links, which may be formed along the same or different types of communication media.

Backhaul Node 132:

Other communication nodes, such as access nodes, repeaters, and other backhaul nodes, may communicate to and from the communication network 104 via a backhaul node 132. In one example embodiment, a backhaul node 132 comprises a backhaul device 138. The backhaul device 138, for example, may transmit communications directly to an aggregation point 124, or to a distribution point 127 which in turn transmits the data to an aggregation point 124.

Figure 4:
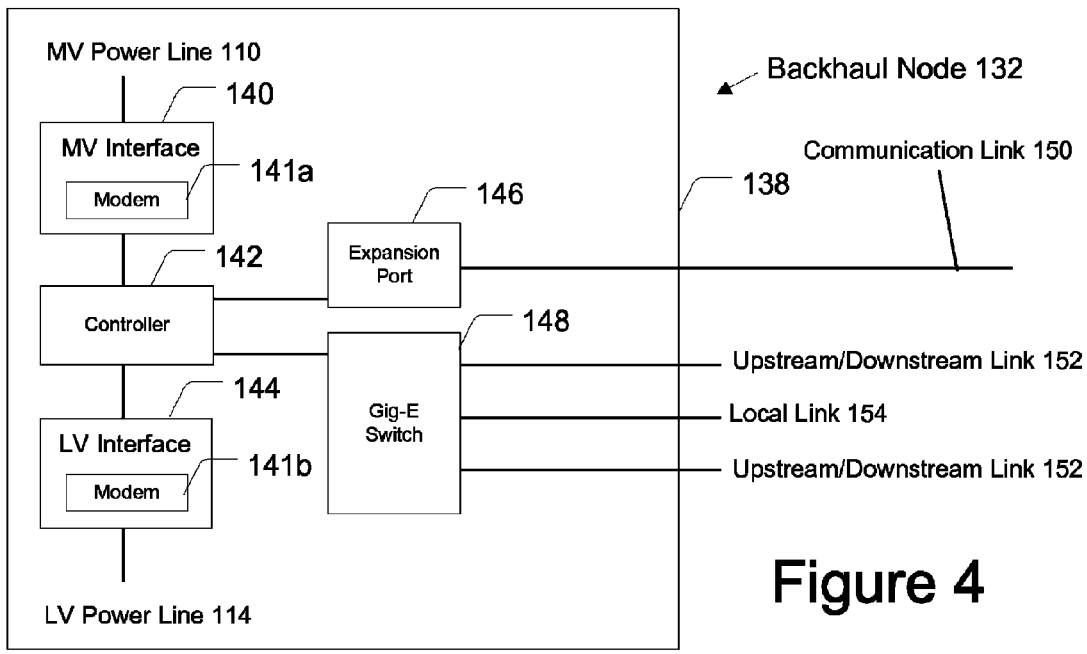
FIG. 4 is a block diagram of an example embodiment of a backhaul device.
Figure 5:
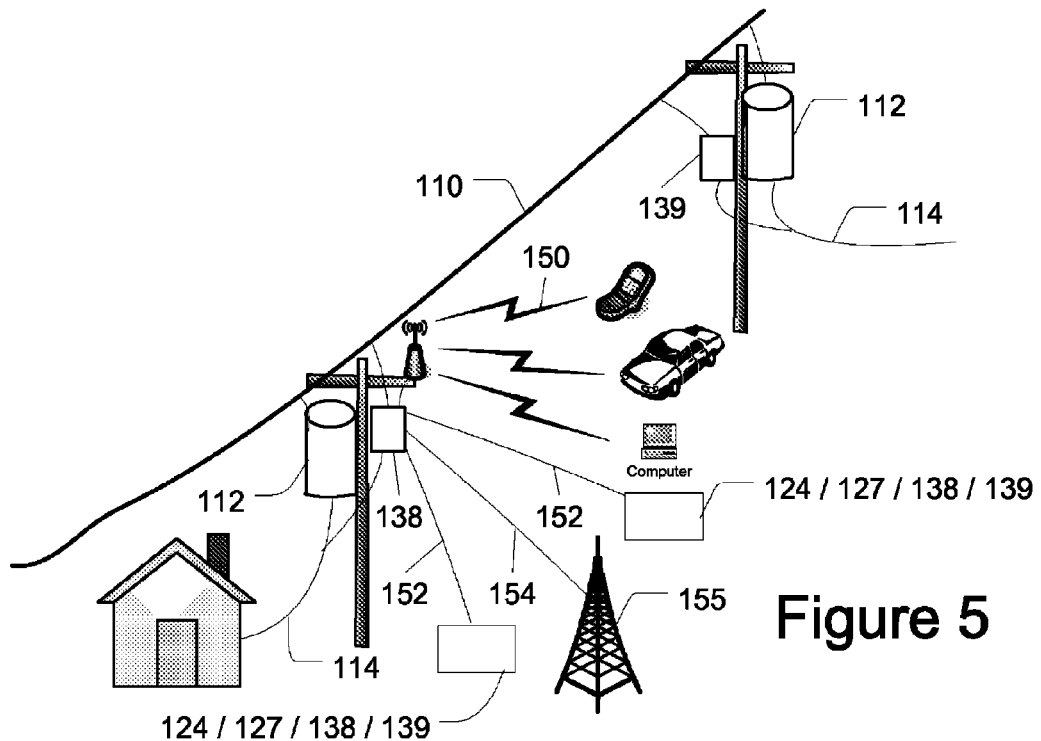
FIG. 5 illustrates an implementation of an example embodiment of a backhaul device capable of transmitting data over a variety of communications media.

FIGS. 4 and 5 show an example embodiment of a backhaul device 138 which may form all or part of a backhaul node 132. The backhaul device 138 may include a medium voltage power line interface (MV Interface) 140, a controller 142, an expansion port 146, and a gigabit Ethernet (gig-E) switch 148. In some embodiments the backhaul device 138 also may include a low voltage power line interface (LV interface) 144. The MV interface is used to communication over the MV power lines and in this example embodiment includes an MV power line coupler coupled to an MV signal conditioner, which is coupled to modem 141a as described above according to an embodiment of this invention. The MV power line coupler prevents the medium voltage power signal from passing from the MV power line 110 to the rest of the device's circuitry, while allowing the communications signal to pass between the backhaul device 138 and the MV power line 110.

The MV signal conditioner may provide one or more of amplification, filtering, frequency translation, and transient voltage protection of data signals communicated over the MV power lines 110. Thus, the MV signal conditioner may be formed by a filter, amplifier, a mixer and local oscillator, and/or other circuits which provide transient voltage protection. The modem 141a may demodulate, decrypt, and decode data signals received from the MV signal conditioner and may encode, encrypt, and modulate data signals to be provided to the MV signal conditioner.

The backhaul device 138 also may include a low voltage power line interface (LV Interface) 144 for receiving and transmitting data over an LV power line 114. The LV interface 144 may include an LV power line coupler coupled to an LV signal conditioner, coupled to a modem 141b, according to an embodiment of this invention. In one embodiment the LV power line coupler may be an inductive coupler. In another embodiment the LV power line coupler may be a conductive coupler. The LV signal conditioner may provide one or more of amplification, filtering, frequency translation, and/or transient voltage protection of data signals communicated over the LV power lines 114. Data signals received by the LV signal conditioner may be provided to the modem 141. Thus, data signals from the modem 141b are transmitted over the LV power lines 110 through the signal conditioner and coupler. The LV signal conditioner may be formed by a filter, amplifier, a mixer and local oscillator, and/or other circuits which provide transient voltage protection. The modem 141b may demodulate, decrypt, and decode data signals received from the LV signal conditioner and may encode, encrypt, and modulate data signals to be provided to the LV signal conditioner.

The backhaul device 138 also may include an expansion port 146, which may be used to connect to a variety of devices. For example, an antenna may be coupled to the expansion port 146 to enable wireless transmission and reception to and from the controller 142. In another embodiment, a wireless access point, which may include a wireless transceiver or modem, may be integral to or coupled to the expansion port 146. Said wireless modem or the controller 142 may establish and maintain a communication link 150. In other embodiments a communication link is established and maintained via expansion port 146 over an alternative communications medium (e.g., fiber optic, cable, twisted pair) using an alternative transceiver device. In such other embodiments the expansion port 146 may provide an Ethernet connection allowing communications with various devices over optical fiber, coaxial cable or other wired medium. In such embodiment the modem may be an Ethernet transceiver (fiber or copper), the modem 141 as described herein, or another suitable modem (e.g., cable modem, DSL modem). In still other embodiments, the expansion port may be coupled to a Wifi access point (IEEE 802.11 transceiver), WiMAX modem, or mobile telephone cell site. The expansion port 146 may be employed to establish a communication link 150 between the backhaul device 138 and devices at a residence, building, other structure, another fixed location, or between the backhaul device 138 and a mobile wireless device. Alternately, various sensors also may be connected to the backhaul device 138 through the expansion port 146. Exemplary sensing devices that may be coupled to the backhaul device 138 through the expansion port 146 include a current sensor, power usage sensing device, a level sensor (to determine pole tilt), a camera (e.g., for monitoring security, detecting motion, monitoring children's areas, monitoring a pet area), an audio input device (e.g., microphone for monitoring children, detecting noises), a vibration sensor, a motion sensor (e.g., an infrared motion sensor for security), a home security system, a smoke detector, a heat detector, a carbon monoxide detector, a natural gas detector, a thermometer, a barometer, a biohazard detector, a water or moisture sensor, a temperature sensor, and a light sensor.

The backhaul device 138 also may include a gigabit Ethernet (Gig-E) switch 148. Gigabit Ethernet is a term describing various technologies for implementing Ethernet networking at a nominal data rate of one gigabit per second, as defined by the IEEE 802.3z and 802.3ab standards. There are a number of different physical layer standards for implementing gigabit Ethernet using optical fiber, twisted pair cable, or balanced copper cable. Accordingly the gig-E switch may be rated at 1 gigabit per second (or greater as for a 10 gigabit Ethernet switch).

The switch 148 may be included in the same housing or co-located with the other components of the node (e.g., mounted at or near the same utility pole or transformer). The gig-E switch 148 maintains a table of which communication devices are connected to which switch 148 port (e.g., based on MAC address). When a communication device transmits a data packet, the switch receiving the packet determines the data packet's destination address and forwards the packet towards the destination device rather than to every device in a given network. This greatly increases the potential data rate of the network because collisions are substantially reduced or eliminated, and multiple communications may occur simultaneously.

The gig-E switch 148 may include an upstream port for maintaining a communication link 152 with an upstream device (e.g., a backhaul node 132, an aggregation point 124, a distribution point 127), a downstream port for maintaining a communication link 152 with a downstream device (e.g., another backhaul node 134; an access node 134), and a local port for maintaining a communication link 154 to a Gig-E compatible device such as a mobile telephone cell cite 155 (i.e., base station), an access node 134, another backhaul node 132, or another device. In some embodiments the gig-E switch 148 may include additional ports.

In one embodiment, the Gig-E switch 148 may be connected to a mobile telephone cell site (via link 154) configured to provide mobile telephone communications (digital or analog) and use the signal set and frequency bands suitable to communicate with mobile phones, PDAs, and other devices configured to communicate over a mobile telephone network. Mobile telephone network and mobile telephone communications of mobile telephone cell sites, as used herein, are meant to include analog and digital cellular telephone networks and communications, respectively, including, but not limited to AMPS, 1G, 2G, 3G, GSM (Global System for Mobile communications), PCS (Personal Communication Services) (sometimes referred to as digital cellular networks), and other cellular telephone networks. One or more of these networks may use various access technologies such as frequency division multiple access (FDMA), time division multiple access (TDMA), or code division multiple access (CDMA) (e.g., some of which may be used by 2G devices) and others may use CDMA2000 (based on 2G Code Division Multiple Access), WCDMA (UMTS)—Wideband Code Division Multiple Access, or TD-SCDMA (e.g., some of which may be used by 3G devices).

Communications may be input to the gig-E switch 148 from the MV interface 140, LV interface 144 or expansion port 146 through the controller 142. Communications also may be input from each of the upstream port, local port and downstream port. The gig-E switch 148 may be configured (by the controller 142 dynamically) to direct the input data from a given input port through the switch 148 to the upstream port, local port, or downstream port. Communications received at the upstream port or downstream port need not be provided (if so desired) to the controller 142. Specifically, communications received at the upstream port or downstream port need not be buffered or otherwise stored in the controller memory or processed by the controller. The controller 142 controls the gig-E switch 148, allowing the switch 148 to pass data upstream and downstream (e.g. according to parameters (e.g., prioritization, rate limiting, etc.) provided by the controller).

The backhaul device 138 also may include a controller 142 which controls the operation of the device 138. The backhaul 138 may also include a router (for routing, bridging, or switching functionality), which routes data along an appropriate path (e.g., determining a destination for the data). In this example embodiment, the controller includes program code for performing routing (hereinafter to also include switching and/or bridging). Thus, the controller 142 may maintain a table of which communication devices are connected to port in memory. The controller 142, of this embodiment, matches data packets with specific messages (e.g., control messages) and destinations, performs traffic control functions, performs usage tracking functions, authorizing functions, throughput control functions and similar related services. Communications entering the backhaul device 138 from the MV power lines 110 at the MV interface 140 are received, and then may be routed to the LV interface 144, expansion port 146 or gig-E switch 148. Communications entering the backhaul device 138 from the LV power lines 114 at the LV interface 144 are received, and may then be routed to the MV interface 140, the expansion port 146, or the gig-E switch 148. Communications entering the backhaul point 138 from the expansion port 146 are received, and may then be routed to the MV interface 140, the LV interface 144, or the gig-E switch 148. Accordingly, the controller 142 may receive data from the MV interface 140, LV interface 144 or the expansion port 146, and may route the received data to the MV interface 140, LV interface 144, the expansion port 146, or gig-E switch 148. In this example embodiment, user data may be routed based on the destination address of the packet (e.g., the IP destination address). Not all data packets, of course, are routed. Some packets received may not have a destination address for which the particular backhaul device 138 routes data packets (and may be ignored). Additionally, some data packets may be addressed directly to the backhaul device 138 in which case the backhaul device may process the data as a control message.

A given backhaul node 32 may maintain communication links with multiple access nodes 134 via one or more MV power lines. In some embodiments, a different communication channel may be assigned to each communication link managed by the backhaul node 132. Consider an embodiment in which communications over the MV power line 110 using a modem 141 may transmit within a frequency range of approximately 2-50 MHz. Also consider a MV power line communication sub-channel to be an approximately 4 MHz frequency band. Within such a 48 MHz frequency band, approximately 12 sub-channels of approximately 4 MHz per sub-channel may be assigned for communicating through the given backhaul node 132. Respective sub-channels may be turned on and off as needed.

Figure 6:
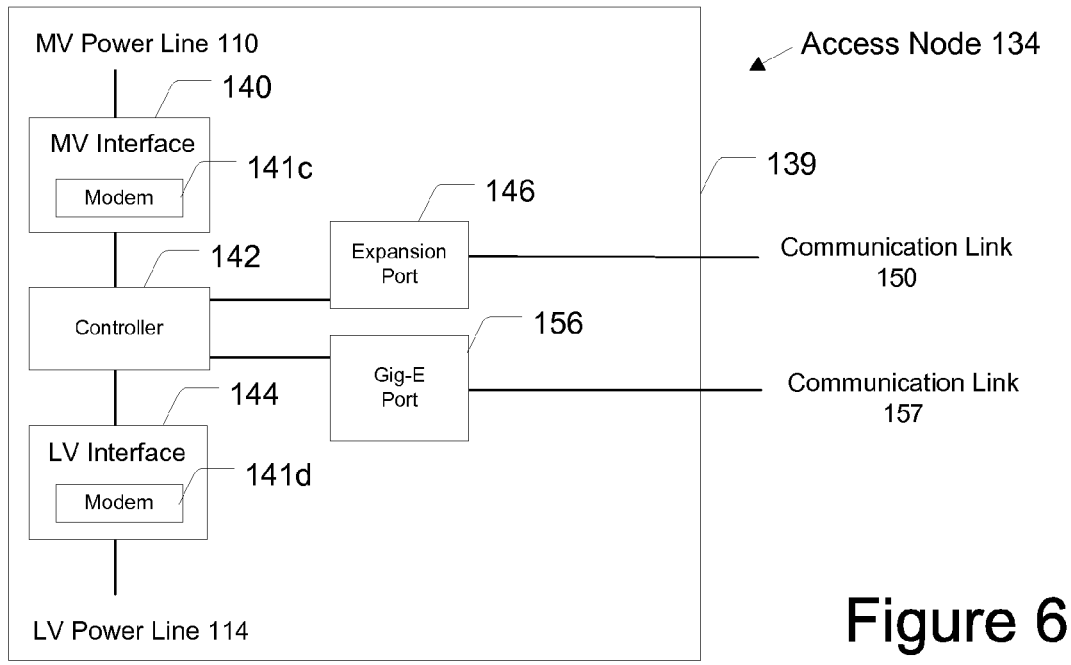
FIG. 6 is a block diagram of an example embodiment of an access device.
Figure 7:
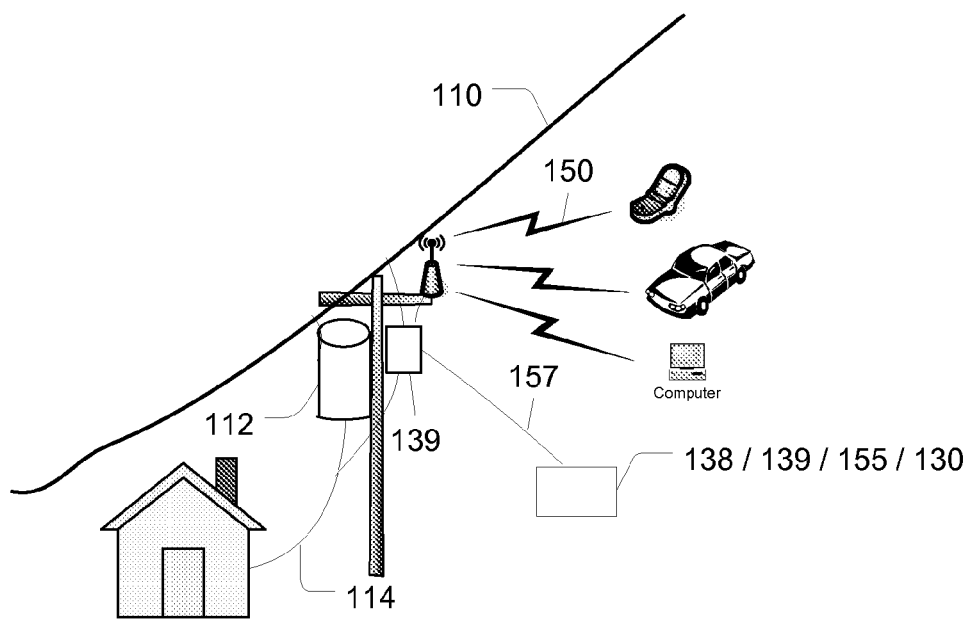
FIG. 7 illustrates an implementation of an example embodiment of an access device capable of transmitting data over a variety of communications media.

Access Node 134:

The backhaul nodes 132 may communicate with user devices 130 via one or more access nodes 134, which may include an access device 139. FIGS. 6 and 7 show an example embodiment of such an access device 139 for providing communication services to mobile devices and to user devices 130 at a residence, building, or other location.

In one example embodiment, access devices 139 provide communication services for user devices 130 such as security management; IP network protocol (IP) packet routing; data filtering; access control; service level monitoring; service level management; signal processing; and modulation/demodulation of signals transmitted over the communication medium.

The access device 139 take the form of a bypass device that moves data between an MV power line 110 and an LV power line 114. The access device 139 may include a medium voltage power line interface (MV Interface) 140 having a modem 141c as described above, a low voltage power line interface (LV interface) 144 having a modem 141d as described above, a controller 142, and an expansion port 146. The MV interface 140, modems 141c-d, LV interface 144, controller 142 and expansion port 146 may have the functionality and functional components as previously described above with regard to FIG. 4 and the backhaul device 138. The access device 139 also may include a gigabit Ethernet (gig-E) port 156. The gig-E port 156 maintains a connection using a gigabit Ethernet protocol as described above for the gig-E switch 148 of FIG.

The Gig-E port 156 may maintain an Ethernet connection for communicating with various devices over optical fiber, coaxial cable or other wired medium. For example, a communication link 157 may be maintained between the access device 139 and another device through the gig-E port 156. For example, the gig-E port 156 may provide a connection to user devices 130, sensors (as described above with regard to the expansion port 146), or a base station or other wireless device.

Communications may be received at the access device 139 through the MV interface 140, LV interface 144, expansion port 146 or gig-E port 156. For example, communications may enter the access device 139 from the MV power lines 110 through the MV interface 140, and then may be routed to the LV interface 142, expansion port 146 or gig-E port 156. Communications may enter the access device 139 from the LV power lines 114 through the LV interface 144, and then may be routed to the MV interface 140, the expansion port 146, or the gig-E port 156. Communications may enter the access device 139 from the expansion port 146, and then may be routed to the MV interface 140, the LV interface 144, or the gig-E port 156. Communications may enter the access device 139 via the gig-E port 156, and then may be routed to the MV interface 140, the LV interface 144, or the expansion port 146. The controller 142 controls communications through the access device 139. Accordingly, the access device 139 receives data from the MV interface 140, LV interface 144, the expansion port 146, or the gig-E port 156 and may route the data to the MV interface 140, LV interface 144, expansion port 146, or gig-E port 156 under the direction of the controller 142 based on a routing table or other information (i.e., it determines a destination for the data). In one example embodiment, the access node 134 may be coupled to a backhaul node 132 via a wired medium coupled to Gig-E port 156 while in another embodiment, the access node 134 may be coupled to the backhaul node 132 via an MV power line (via MV interface 140). In yet another embodiment, the access node 134 may be coupled to a backhaul node 132 via a wireless link (via expansion port 146 or Gig-E port 156).

In a manner similar to that described above for a backhaul device 138, according to an embodiment of the invention a given access device 139 may communicate with a backhaul node 132, another access node 134, a power line modem 136, or another communication device over various communications media. In some embodiments, the modem 141 is coupled to a splitter which divides a signal transmitted from the modem 141c or 141d along separate paths for coupling to one or more of a power line, a coaxial cable, a twisted pair and/or a wireless medium. Also, incoming communications may be received at the modem 141 through any of the various communications media via the splitter. As described above, the transmitted and received communications may be upbanded or downbanded (in frequency) according to a communication frequency being used by a particular communication medium.

Consider an example in which communications are received at the access node 134 from a residence along a LV power line 114 using a 2-6 MHz carrier signal. In some embodiments, the access device's modem 141d may receive the communication and then upband the communication to an appropriate sub-channel within the range of 4-50 MHz for transmission along a MV power line 110.

In another embodiment a device located at the utility pole (i.e., similarly located to access device 138 of FIG. 5), the received signal form the user device may be upbanded (or downbanded) to an appropriate sub-channel (without demodulating the received signal) for wired transmission over the MV power line or other media (to the backhaul node) or for wireless retransmission. Similarly, communications received over via MV power line 110 may be upbanded for wireless transmission to the user device or downbanded for transmission over the LV power lines 114 without demodulation. Further, the transmitted and received communications may be upbanded or downbanded for communicating over a coaxial cable, twisted pair, or other media.

In one embodiment a subset of sub-carriers may be allocated to an individual user (e.g. from an access node), application or device, or groups of users, applications or devices (e.g., PLC device such an access node). This may be used to create a sub-channel for individual user devices, application or device (e.g., PLC device) or groups of user devices, applications or devices (e.g., PLC devices). Sub-carriers may be manually or system assigned statically, by a commanding network management system or controller module, or may be dynamically allocated and reallocated according to changing system topologies, or the changing needs users, applications or devices. Such assignment and change of assignment may be performed via software running in the controller operating the device which may detect conditions or receive a command from the network management system. In one embodiment, sixteen sets of twelve sub-carriers each are defined, where one, two, four, eight or all sets can be assigned to a user device or access node.

In one example embodiment, each access node may communicate with a backhaul node via a different sub-channel over the MV power lines. Each sub-channel may be further divided into two sub-channels (for a FDMA system) or may be used by the two devices in time slots (for a TDMA system). Access nodes more distant from the backhaul nodes may be allocated a lower frequency sub-channel because higher frequencies tend to attenuate more quickly over power lines. Additionally, access nodes more near the backhaul node may be designated a lower transmission power (e.g., so that said transmissions are not received by, and do not interfere with, access nodes communicating with different backhaul nodes connected to the same the MV power line).

Other Devices:

Another communication device is a repeater (e.g., indoor, outdoor, low voltage (LVR) and/or medium voltage) which may form part of a repeater node 135 and include a modem 141 as described herein. A repeater serves to extend the communication range of other communication elements (e.g., access devices, backhaul devices, and other nodes). The repeater may be coupled to power lines (e.g., MV power line; LV power line) and other communication media (e.g., fiber optical cable, coaxial cable, T-1 line or wireless medium). Note that in some embodiments, a repeater node 135 may also include a device for providing a link to a user device 130 (and thus also serve as an access node 134). In one embodiment the repeater 135 may be located at or in the vicinity of a utility meter for the premises. In another embodiment the repeater may be plugged into a wall outlet within the premises.

In various embodiments a user device 130 may be coupled to an access node 134 along a communication path that includes one or more forms of communications media. In one configuration an access node 134 may be coupled to a communication device at a subscriber's premises by a LV power line 114. In other configurations an access node 134 may be coupled to a communication device at a subscriber's premises by a coaxial cable, twisted pair or wireless media. Such communication device may include a modem 141 (e.g., forming part of power line modem device 136) having a capability of coupling to a power line and other communications media accordingly. Such modem device 136 may implement a versatile signal set via modem 141 as previously described.

At the subscriber premises the power line modem device 136 in turn may be coupled to a user device 130 directly or along various communication paths. For example, a user device 130 may be coupled to the power line modem device 136 by a coaxial cable and cable modem, by a twisted pair and a DSL modem, by wireless media and a wireless transceiver, or by an internal LV power line and a power line modem device (e.g., a power line modem implementing a HomePlug 1.0 or A/V standard).

In some embodiments described herein, the modem may be replaced with a frequency translation device that does not demodulate the data. One advantage of implementing a frequency-shifted, substantially WiMAX compatible signal set (or other signal set) is that a communication may be transmitted along alternative communications media. Thus, a power line communication received at access node 134 (e.g., from backhaul node 132) may be filtered, amplified, upbanded (in frequency), amplified, and coupled to a wireless antenna and transmitted wirelessly. A subscriber may use fixed wireless customer premise equipment (CPE) to receive the signal. Upstream data is similarly received wirelessly from a user device at the access node 134, filtered, downbanded, amplified, and coupled to the MV power line. In another example, a communication, such as a communication using the frequency shifted WiMAX signal set, traverses an LV power line 114 (or coaxial cable) into customer premises to a user communication device plugged into a wall outlet. The received signal may be amplified, filtered, upbanded, amplified and wirelessly transmitted to a remote user device.

In other embodiments a multiple in/multiple out (MMO) antenna may be located at the subscriber's structure, such as at a power meter. Communications may be received from the access device 139 into the premises through the MIMO antenna, or transmitted from the premises via the MIMO antenna to the access device 139. A modem 141 as described above may be coupled to the MIMO antenna to transmit and receive communications. Downstream communications may be transmitted toward the user device from the modem 141 along any of various communications media, (e.g., power line, coaxial cable, twisted pair, wireless). Similarly upstream communications may be received at the modem 141 along any of such various communications media.

In some embodiments mobile telephone communications also may be received at the MIMO antenna and power line modem device 136. Such communications may be retransmitted from the modem 141 wirelessly within the home to a mobile phone or other wireless device using a licensed or unlicensed frequency band.

The communication network 104 may be monitored and controlled via a power line server that may be remote from the structure and physical location of the network elements. The controller of the nodes 128 described herein may include executable program code for controlling the operation of the nodes and responding to commands from the PLS received wirelessly or via the MV power line or other media. The PLS may transmit any number of commands to a backhaul nodes 132 and access nodes 134 to manage the system (via the power lines or other media). As will be evident to those skilled in the art, most of these commands are equally applicable for backhaul nodes 132 and access nodes 134. These commands may include altering configuration information, synchronizing the time of the node 128 with that of the PLS, controlling measurement intervals (e.g., voltage measurements), requesting measurement or data statistics, requesting the status of user device activations, rate limiting/shaping, and requesting reset or other system-level commands. Any or all of these commands may require a unique response from the node 128, which may be transmitted by the node 128 and received and stored by the PLS. The PLS may include software to transmit a command to any or all of the nodes (134 and 132) to schedule a voltage and/or current measurement at any particular time so that all of the network elements of the PLCS take the measurement(s) at the same time. In addition, the PLS may transmit software to be executed by the nodes.

Examples of an overhead PLCS, access devices 139, backhaul points 138, repeaters 158, power line servers, and other components are provided in U.S. patent application Ser. No. 11/423,206 filed Jun. 9, 2006, entitled "Power Line Communication Device and Method," which is hereby incorporated by reference in its entirety. A detailed description of an example underground PLCS, its components and features is provided in U.S. patent application Ser. No. 10/973,493 filed Oct. 26, 2004, entitled "Power Line Communications System and Method of Operating the Same," which is hereby incorporated by reference in its entirety. In other embodiments, the nodes 128 (and modem 141 thereof) may communicate over a neutral conductor (that extends to a home or that extends between transformers) of the power distribution system instead of or in addition to the energized conductors (e.g., MV or LV power lines).

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A power line communication device for communicating data signals over a power line, comprising:
    a conditioning circuit configured to be coupled to the power line;
    a first modem integrated circuit communicatively coupled to said conditioning circuitry;
    wherein said first modem integrated circuit is configured to transmit and receive orthogonal frequency division multiplexed data signals that comprise a plurality of sub-carriers;
    wherein said first modem integrated circuit controls the transmit power of each sub-carrier of the plurality of sub-carriers on an individual basis from zero power to a plurality of increments above zero power for a particular data signal;
    wherein said first modem integrated circuit is configured to supply data signals with the transmit power to said conditioning circuitry;
    wherein said conditioning circuitry is configured to amplify the transmit power of the supplied data signals and to couple the amplified data signals to the power line;
    wherein said first modem integrated circuit is configured to output at least some data signals to said conditioning circuit having a first subset of the plurality of sub-carriers at a transmit power that is different than the transmit power for a second subset of the plurality of sub-carriers;
    wherein said conditioning circuit comprises a frequency translation circuit configured to downband the sub-carriers of the data signals received from said first modem integrated circuit;
    wherein said first modem integrated circuit is configured to process received data signals having a delay spread of ten microseconds; and
    wherein the data signals coupled to the power line by said conditioning circuit are compatible with an IEEE 802.16 (e) standard signal set.

2. The device of claim 1, further comprising:
    a housing in which said first modem integrated circuit is disposed; and
    a second modem integrated circuit disposed in said housing and communicatively coupled to said first modem integrated circuit and configured to provide communications to one or more user devices.

3. The device of claim 1, wherein the transmit power for the first subset of the plurality of sub-carriers is zero and the transmit power for the second subset of the plurality of sub-carriers is not zero.

4. The device of claim 3, wherein the first subset of sub-carriers are disposed at one or more frequencies that are between frequencies of those of the second subset of sub-carriers.

5. The device of claim 1, wherein said first modem integrated circuit is adapted to transmit two data signals and wherein the transmit power for the majority of the sub-carriers of each data signal is different.

6. The device of claim 1, wherein said first modem integrated circuit is configured to provide Quality of Service.

7. The device of claim 1, wherein the power line comprises a medium voltage power line.

8. The device of claim 1, wherein the power line comprises a low voltage power line.

9. The device of claim 1, wherein said first modem integrated circuit is adapted to change the modulation used for a subset of the plurality of sub-carriers.

10. The device of claim 1, wherein said first modem integrated circuit is adapted to output a data signal by modulating a third subset of the plurality of sub-carriers using a first modulation scheme and by modulating a fourth subset of the plurality of sub-carriers using a second modulation scheme.

11. The device of claim 10, wherein said first modulation scheme provides a higher data rate than said second modulation scheme and said first modem integrated circuit is configured transition from said first modulation scheme to said second modulation scheme for the fourth subset of sub-carriers.

12. The device of claim 11, wherein said transition is based upon determining an increased error rate.

13. The device of claim 11, wherein said transition is based upon determining a reduced data rate.

14. The device of claim 1, further comprising an antenna communicatively coupled to said first modem integrated circuit.

15. The device of claim 1, wherein said first modem integrated circuit is configured to communicate with a plurality of remote devices and to use a different subset of sub-carriers to transmit data signals to each of the remote devices.

16. The device of claim 1, wherein said first modem integrated circuit is adapted to vary the number of the sub-carriers used to transmit data signals.

17. The device of claim 1, further comprising a housing in which said first modem integrated circuit is disposed; and
    a router disposed in said housing and communicatively coupled to said first modem integrated circuit.

18. The device of claim 17, further comprising a second modem disposed in said housing and communicatively coupled to said router.

19. The device of claim 1, wherein said first modem integrated circuit is configured to output data signals compatible with an IEEE 802.16 (e) standard signal set.

20. The device of claim 1, wherein said first modem integrated circuit is configured to communicate via Orthogonal Frequency Division Multiple Access (OFDMA).

21. The device of claim 1, wherein said first modem integrated circuit is configured to communicate with a plurality of remote devices and is adapted to change the subset of sub-carriers used for communications with each of the remote devices.

22. A method of communicating over a power line, comprising:
    receiving data;
    processing the data via a modem integrated circuit to output one or more modulated data signals comprised of a plurality of sub-carriers;
    wherein a transmit power of each sub-carrier of the plurality of sub-carriers can be controlled by the modem integrated circuit on an individual basis from zero power to a plurality of increments above zero power for each data signal of the one or more data signals;
    wherein said first modem integrated circuit is configured to process received data signals having a delay spread of ten microseconds;
    wherein the transmit power for each sub-carrier of the plurality of sub-carriers of different data signals can be varied by the modem integrated circuit over a plurality of increments above zero power;
    frequency shifting the one or more modulated data signals to a lower frequency band;
    amplifying the transmit power of the one or more modulated data signals;
    coupling the amplified frequency shifted modulated data signals to the power line; and wherein the amplified frequency shifted modulated data signals coupled to the power line are compatible with an IEEE 802.16 (e) standard signal set.

23. The method of claim 22, wherein the first modem integrated circuit is configurable to output a power per carrier for a first subset of the plurality of sub-carriers that is at a first power level and a power per carrier for a second subset of the plurality of sub-carriers that is at a second power level and wherein in a first modem configuration the first power level and the second power level are different and non-zero power.

24. The method of claim 23, wherein in a second modem configuration the power per carrier for the first subset of the plurality of sub-carriers is zero and the power per carrier for the second subset of the plurality of sub-carriers is not zero.

25. The method of claim 24, wherein the sub-carriers of the first subset are disposed at one or more frequencies that are between frequencies of the sub-carriers of the second subset.

26. The method of claim 22, wherein the modem integrated circuit is configured to communicate via Orthogonal Frequency Division Multiple Access (OFDMA).

27. The method of claim 22, further comprising providing Quality of Service with the modem integrated circuit.

28. The method of claim 22, wherein the power line comprises a medium voltage power line.

29. The method of claim 22, wherein the power line comprises a low voltage power line.

30. The method of claim 22, further comprising changing the modulation scheme used for a subset of the plurality of sub-carriers over time while not changing the modulation scheme used for a different subset of the plurality of sub-carriers.

31. The method of claim 22, further comprising outputting a data signal via the modem integrated circuit by modulating a first subset of the plurality of sub-carriers using a first modulation scheme and by modulating a second subset of the plurality of sub-carriers using a second modulation scheme and wherein the first and second subsets of the plurality of sub-carriers are coupled to the power line simultaneously.

32. The method of claim 31, wherein said first modulation scheme provides a higher data rate than said second modulation scheme and the modem integrated circuit is configured to transition from said first modulation scheme to said second modulation scheme for the second subset of sub-carriers.

33. The method of claim 32, wherein said transition is based upon determining an increased error rate.

34. The method of claim 32, wherein said transition is based upon determining a reduced data rate.

35. The method of claim 22, further comprising providing an antenna coupled to the modem integrated circuit.

36. The method of claim 22, wherein the modem integrated circuit is configured to communicate with a plurality of remote devices and to use a different subset of sub-carriers for data signals transmitted to each of the remote devices.

37. The method of claim 22, further comprising varying the number of the sub-carriers used to provide data signals over time.

38. The method of claim 22, further comprising frequency shifting the sub-carriers of the data signals to a lower frequency band.

39. The method of claim 22, further comprising routing the received data.

40. The method of claim 39, wherein receiving data comprises demodulating a received data signal.

41. The method of claim 22, wherein the received data is received from one or more user devices.

42. The method of claim 22, further comprising providing a plurality of data signals via the modem integrated circuit and wherein the transmit power for the majority of the sub-carriers of different data signals is different.

43. The method of claim 22, wherein the modem integrated circuit is configured to communicate with a plurality of remote devices and to vary the subset of sub-carriers used for communications with each of the remote devices.

44. A method of communicating over a power line, comprising:
receiving data from a user device;
determining a destination for the data;
modulating the data via a modem integrated circuit to output one or more data signals comprised of a plurality of sub-carriers;
wherein a transmit power of each sub-carrier of the plurality of sub-carriers can be controlled by the modem integrated circuit on an individual basis from zero power to a plurality of increments above zero power for each data signal of the one or more data signals;
wherein the transmit power for each subcarrier of the plurality of sub-carriers of different data signals can be varied by the modem integrated circuit over a plurality of increments above zero power;
wherein said first modem integrated circuit is configured to process received data signals having a delay spread of ten microseconds;
conducting the one or more data signals from the modem integrated circuit to a conditioning circuit;
frequency shifting the plurality of sub-carriers of the one or more data signals with the conditioning circuit;
amplifying the transmit power of the frequency shifted plurality of sub-carriers of the one or more data signals with the conditioning circuit;
coupling the amplified data signals to the power line; and
wherein the amplified data signals coupled to the power line are compatible with an IEEE 802.16 (e) standard signal set.

45. The method of claim 44, wherein the modem integrated circuit is configurable to output a power per carrier for a first subset of the plurality of sub-carriers that is at a first power level and a power per carrier for a second subset of the plurality of sub-carriers that is at a second power level and wherein in a first modem configuration the first power level and the second power level are different and non-zero power.

46. The method of claim 44, wherein the modem integrated circuit is configured to communicate with a plurality of remote devices and is adaptable to vary the subset of sub-carriers used for communications with each of the remote devices.

47. The method of claim 44, wherein the modem integrated circuit is configured to communicate with a plurality of remote devices and to use a different subset of sub-carriers for data signals transmitted to each of the remote devices.

48. The method of claim 44, wherein the one or more data signals output by the modem integrated circuit are compatible with an IEEE 802.16 standard signal set.

49. The method of claim 22, wherein the one or more modulated data signals output by the modem integrated circuit are compatible with an IEEE 802.16 standard signal set.

* * * * *